UNITED STATES PATENT OFFICE.

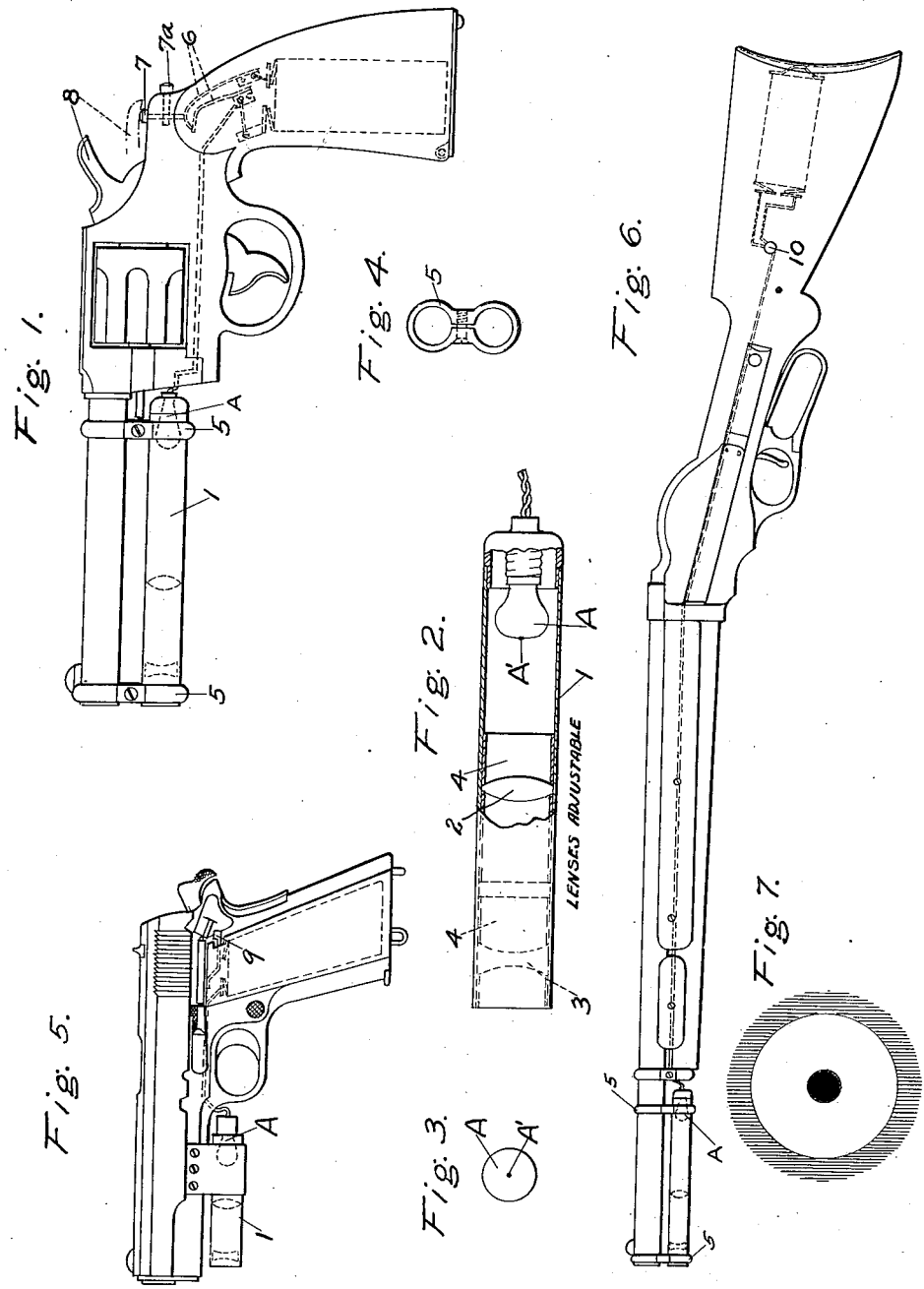

CLIFFORD A. LEWIS, OF PORTLAND, OREGON.

SIGHT-LIGHT FOR FIREARMS.

1,215,171.

Specification of Letters Patent.

Patented Feb. 6, 1917.

Application filed December 2, 1914. Serial No. 875,072.

*To all whom it may concern:*

Be it known that I, CLIFFORD A. LEWIS, a citizen of the United States, residing in the city of Portland, county of Multnomah, and State of Oregon, have invented certain new and useful Improvements in Sight-Lights for Firearms, of which the following is a specification.

My invention relates to improvements in sight lights for firearms of the character referred to in United States Letters Patent Nos. 982,280, 1,045,800, and 1,070,348, heretofore issued to me, and by means of which improvements I am able to get better and more accurate results. Among the salient objects of my present invention are,—to provide a sight light of special construction whereby greater efficiency is secured, and in doing this I use two lenses with a special lamp, particularly designed for this purpose; to provide in connection with a device of this character means for causing a center spot in the light as thrown upon the object aimed at, thus making possible a more accurate aim. Other objects and advantages will be apparent from the following description of the invention, taken with the accompanying sheet of drawings, in which,—

Figure 1 is a side elevation of a pistol with my invention applied thereto;

Fig. 2 is a side elevation of the invention apart from a gun, with a part broken out of the side to show the interior construction;

Fig. 3 is an end view of the lamp used in my sight light and shows a spot in the center thereof;

Fig. 4 is a detail view of means for securing the device to a pistol, as shown in Fig. 1, or a gun, shown in Fig. 6;

Fig. 5 is a side elevation of a new U. S. automatic, with my invention applied thereto;

Fig. 6 is a side elevation of a shot gun with my invention applied thereto; and

Fig. 7 shows the light effect on an object aimed at with the center spot caused by the spot on the end of the lamp.

Referring now to the drawings more in detail, and particularly to Figs. 2 and 3, the lamp A, is a special tungsten miniature lamp, made tipless. Instead of burning in vacuum, the interior of the lamp is filled with nitrogen. This gives a brilliant white light, with double the candle power, and with less voltage, and at the same time gives longer range of light. I am also able to decrease the size of my batteries and thereby enabled to make the handles of pistols more nearly normal in size.

I have also discovered that in order to successfully produce a spot in the light effect thrown on the object aimed at, it is necessary to place the spot on the lamp itself instead of on the lens. I have found that by placing a small dot of drawing ink, about the size of a pin head, of any desired color, but preferably black, red or green, upon the center of the end of the lamp, as indicated at A', Figs. 2 and 3, there will be thrown a large dot in the center of the light which strikes the object aimed at, which, at 60 to 75 feet, is about the size of a silver dollar.

In the embodiment of my invention as here shown, I prefer to use a straight cylindrical tube 1, in which to mount my lamp and lenses 2 and 3, as indicated in Fig. 2. I place a plus lens of twenty diopters power two inches from the light, as indicated at 2, and then place a lens of 1.25 diopters minus power, designated 3, seven-eighths of an inch in front of the plus lens. The use of the minus lens is to correct the aberration, and to regulate the size of the light area. The distance of the light from the lens, and the length of the tube may be varied at will by changing the strength of the lenses and varying the distance the lenses are separated.

In order to meet the various conditions arising from the irregularities in the lamps, I place my lenses in mountings in such manner that they can be adjusted in either direction, thus enabling me to regulate the distance they are from the lamp, or the distance between the lamps. This I accomplish by using telescoping inner tubes, as 4—4, for carrying the lenses, as indicated in dotted lines in Fig. 2. These are slidably mounted in the main tube 1.

The device can be readily attached to and used with any gun.

In Fig. 1 I have shown it in use with a pistol, secured thereto by means of spring ring clamping members, 5—5, as clearly illustrated in Fig. 4. The circuit connections are shown in dotted lines, running back to the battery in the handle, also indicated in dotted lines, with circuit-breaking members 6—6, adapted to be moved together automatically by a pin 7, when the hammer 8 is pulled back, as clearly illustrated in dotted lines, Fig. 1. Pin 7 may be locked down by a cross pin 7ª, as indicated, if desired.

In Fig. 5 I have shown my invention applied to one of the new U. S. automatic revolvers, as indicated, with the battery mounted in the side of the handle, as indicated by the dotted lines, and with the circuit connections running from the lamp A thereto, with a switch contact member 9, positioned to be moved with the thumb at will to complete the circuit.

In Fig. 6 the light is shown in use with a shot gun, with a battery set in the body, as indicated in dotted lines, and with a switch button of any simple and desired form set at 10, in the side of the handle.

In Fig. 7 I have illustrated the light effect as thrown by my device on the object aimed at, with the center dark or colored spot indicated in black.

I am aware that slight changes can be made in the embodiment of my improvements here shown for illustrative purposes, and I do not, therefore, limit the invention to these details, except as I may be limited by the hereto appended claim.

I claim,—

In a device of the character described, a tubular member, a lamp mounted therein and provided in the center of its end with a dark spot and two coöperating lenses adjustably mounted therein and adjustable with relation to each other and to said lamp, substantially as indicated.

Signed at Portland, Multnomah county, Oregon, this 25th day of November, 1914.

CLIFFORD A. LEWIS.

In presence of—
J. E. CROMAN,
R. B. FRENCH.